Feb. 23, 1954

C. W. HENDERSON 2,669,811

ARTICLE FORMING APPARATUS

Filed Feb. 9, 1951

INVENTOR
C.W. HENDERSON
BY W.C. Parnell
ATTORNEY

Feb. 23, 1954   C. W. HENDERSON   2,669,811
ARTICLE FORMING APPARATUS
Filed Feb. 9, 1951   11 Sheets-Sheet 3

INVENTOR
C.W. HENDERSON
BY
W.C. Parnell
ATTORNEY

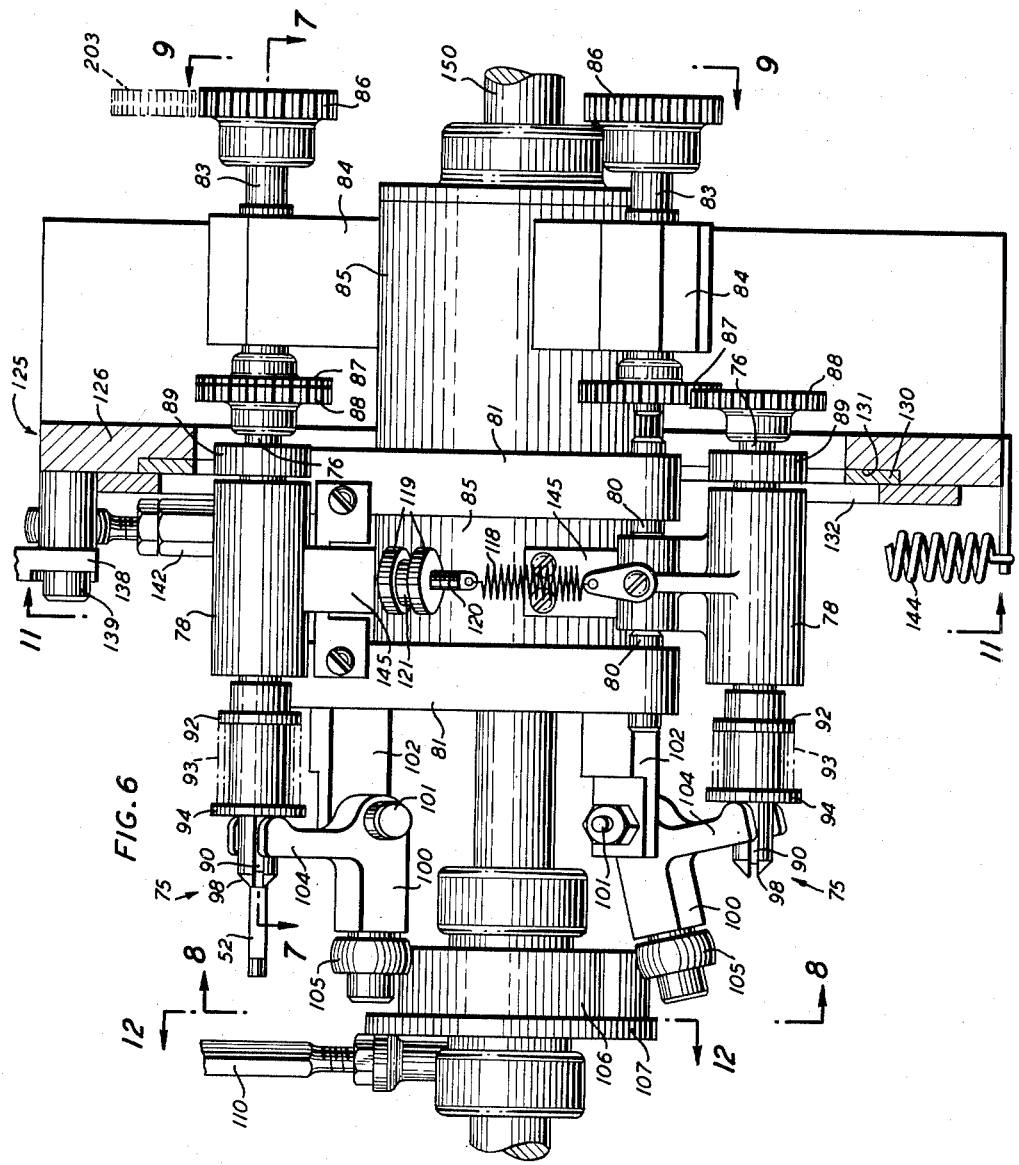

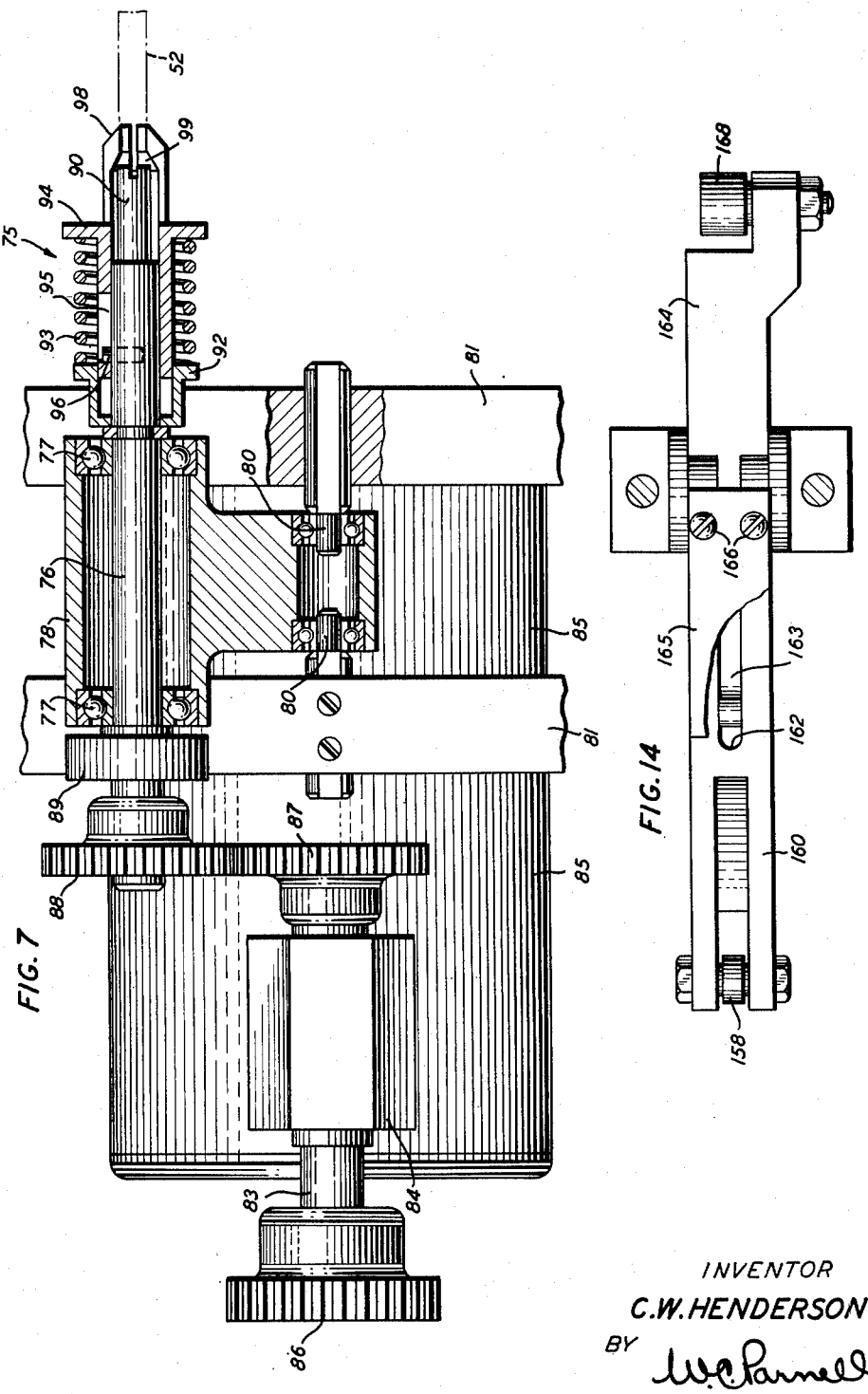

Feb. 23, 1954  C. W. HENDERSON  2,669,811
ARTICLE FORMING APPARATUS
Filed Feb. 9, 1951  11 Sheets-Sheet 6
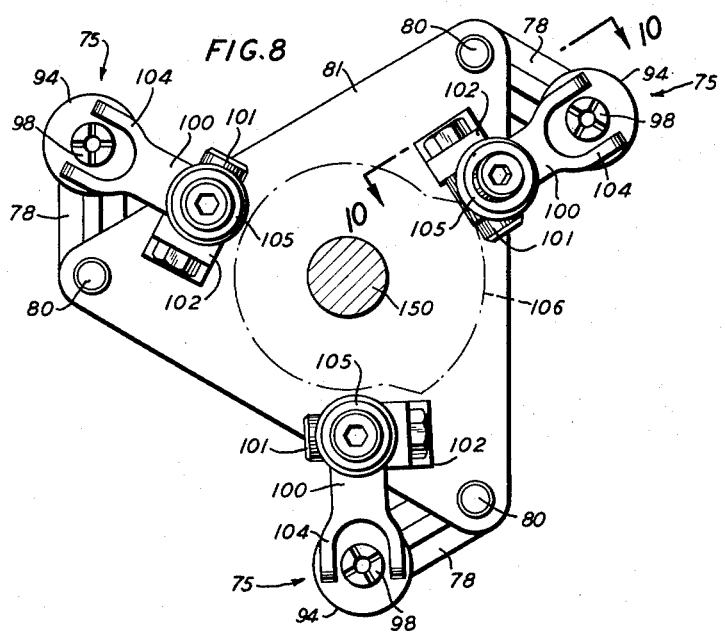
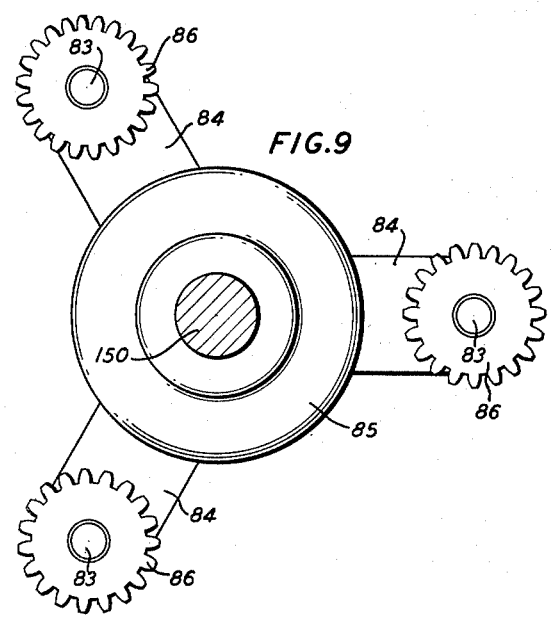
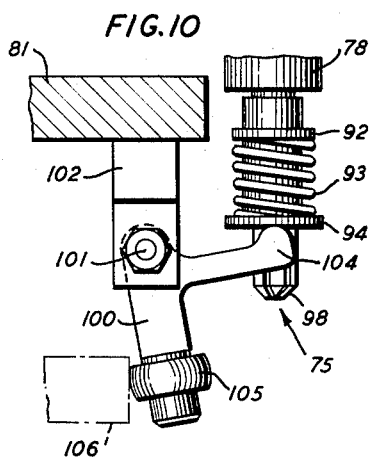
INVENTOR
C.W. HENDERSON
BY W. C. Parnell
ATTORNEY Feb. 23, 1954  C. W. HENDERSON  2,669,811
ARTICLE FORMING APPARATUS
Filed Feb. 9, 1951  11 Sheets-Sheet 7

INVENTOR
C.W. HENDERSON
BY
W.C. Parnell
ATTORNEY

Feb. 23, 1954  C. W. HENDERSON  2,669,811
ARTICLE FORMING APPARATUS
Filed Feb. 9, 1951  11 Sheets-Sheet 9

INVENTOR
C.W. HENDERSON
BY W.C. Parnell
ATTORNEY

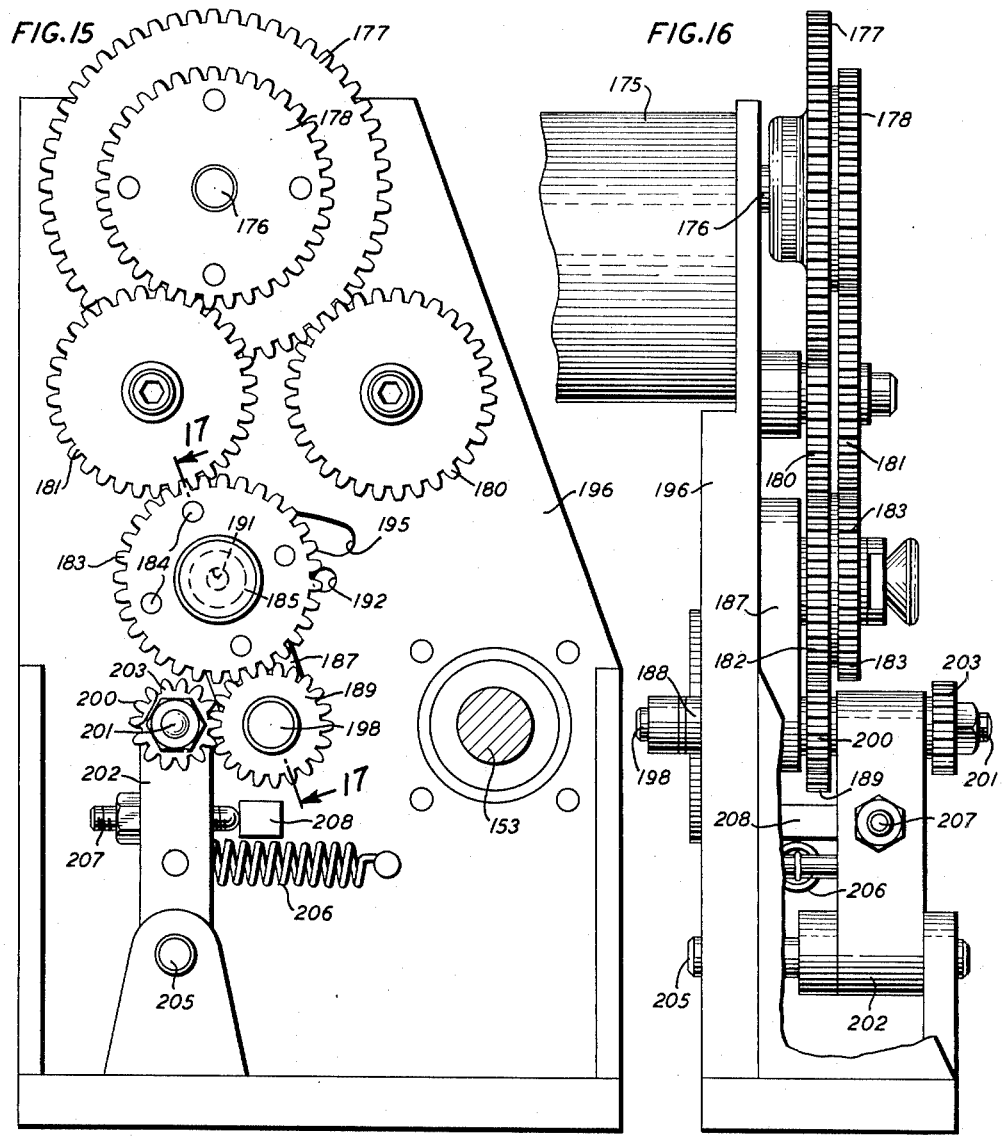
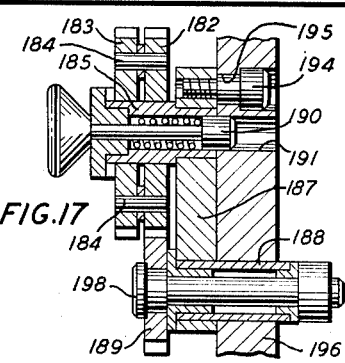

Feb. 23, 1954  C. W. HENDERSON  2,669,811
ARTICLE FORMING APPARATUS
Filed Feb. 9, 1951  11 Sheets-Sheet 11
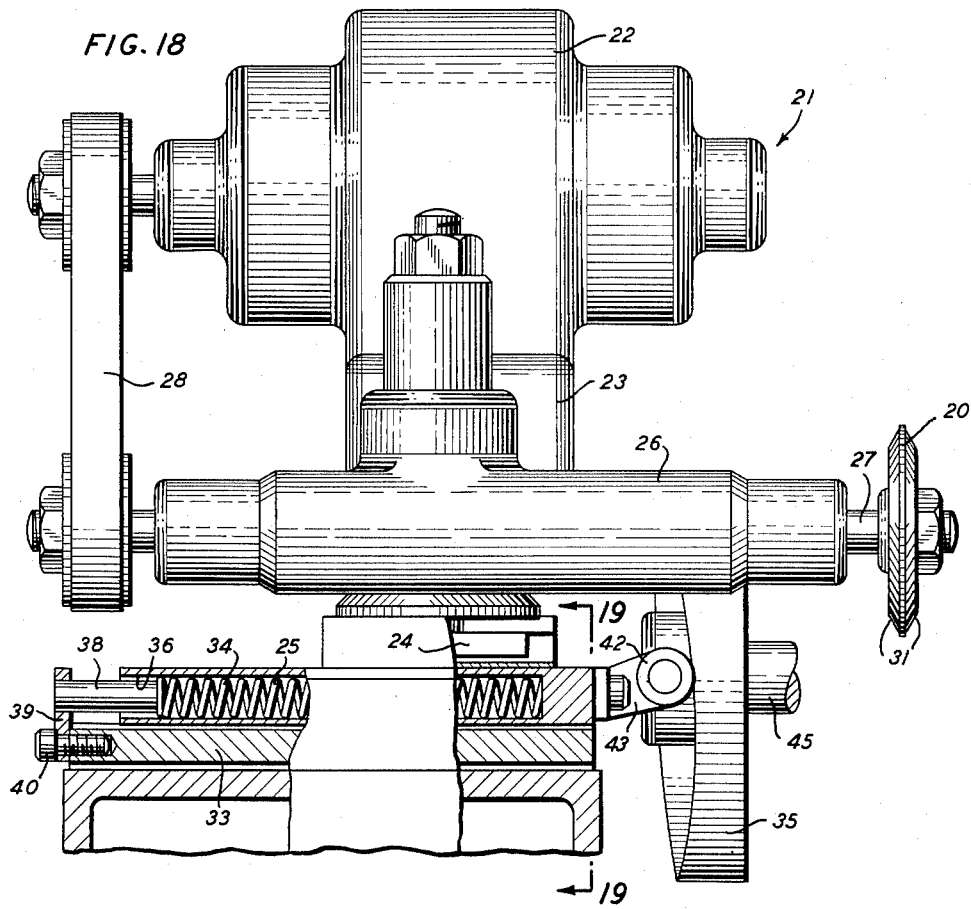
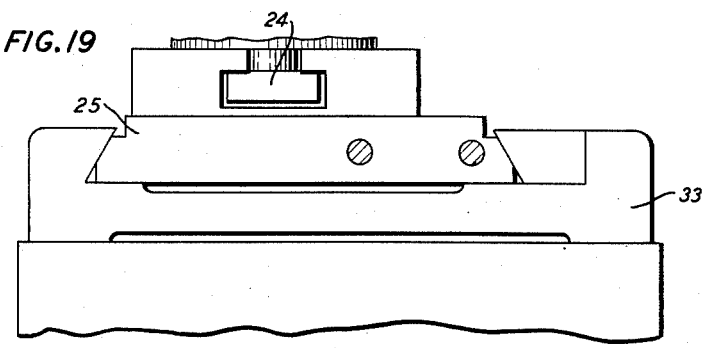
INVENTOR
C. W. HENDERSON
BY
W. C. Parnell
ATTORNEY Patented Feb. 23, 1954

2,669,811

UNITED STATES PATENT OFFICE 2,669,811

ARTICLE FORMING APPARATUS

Clifford W. Henderson, Emmaus, Pa., assignor to Western Electric Company, Incorporated, New York, N. Y. a corporation of New York Application February 9, 1951, Serial No. 210,201

5 Claims. (Cl. 51—37)

This invention relates to article cutting apparatus and more particularly to automatic resistor helixing apparatus.

Carbon resistors of a particular type for use in the telephone industry are formed of cylindrical ceramic members of given lengths and diameters subsequently provided with coatings of carbon resistance material after which the ends of each article or resistor are coated with a conductive material, such as silver, providing terminals therefor. This is the condition of the article at the time it reaches the present apparatus. The final forming of the article includes the cutting of a helical groove through the carbon material to produce a resistor having a main body of ceramic material with terminals of conductive material at the ends thereof connected by a spiral formation of carbon resistance material.

An object of the present invention is to provide an apparatus which is completely automatic in operation yet simple in structure and highly efficient in successively forming articles such as carbon resistors by cutting grooves of predetermined contours therein.

With this and other objects in view, the invention comprises an article forming apparatus including a chuck to support the article movable from a loading position to an operating position, the chuck being driven at the operating position relative to a rotatable cutter while a mechanism causes relative movement of the cutter and chuck whereby a helical groove will be cut in the article.

In the present embodiment of the invention, although separate driving means is provided for the cutter and for the chuck when in the operating position, the synchronized actions of the various units of the apparatus are under the control of their respective cams on a single cam shaft. For example, the articles are removed singly from a supply and located where the three chucks of the turret are successively positioned while open and then closed to grip the articles before moving them to the operating position. While the chucks are in the operating position, they are automatically connected to a variable drive to cause rotation of the chucks with their articles at predetermined speeds whereby varied numbers of convolutions may be cut in the carbon coatings of the articles. During the interval of time each chuck is in the operating position, it is caused to move under a variable force into the cutting position to move the article against the rotatable cutter adjacent the start of the traversing motion of the cutter. At or prior to the end of the traversing motion of the cutter, the chuck is moved out of the cutting position, determining the end of the helical groove in the article. The article or resistor is now completed and is ejected at the next station of the turret.

Other objects and advantages will be apparent from the following detailed description when considered in conjunction with the accompanying drawings wherein:

Fig. 6 is a fragmentary detailed view of the chuck supporting the turret and associated mechanism;

Fig. 7 is an enlarged sectional view taken along the line 7—7 of Fig. 6;

Fig. 8 is a sectional view taken along the line 8—8 of Fig. 6;

Fig. 9 is a sectional view taken along the line 9—9 of Fig. 6;

Fig. 10 is a fragmentary sectional view taken along the line 10—10 of Fig. 8;

Fig. 14 is a fragmentary detailed view taken along the line 14—14 of Fig. 13;

Fig. 15 is a sectional view taken along the line 15—15 of Fig. 1, illustrating the chuck driving mechanism;

Fig. 16 is a side elevational view of the mechanism shown in Fig. 15;

Fig. 17 is a fragmentary sectional view taken along the line 17—17 of Fig. 15;

Fig. 18 is a detailed view of the unit for driving and traversing the grinding wheel; and Fig. 19 is a sectional view taken along the line 19—19 of Fig. 18.

Figure 1:
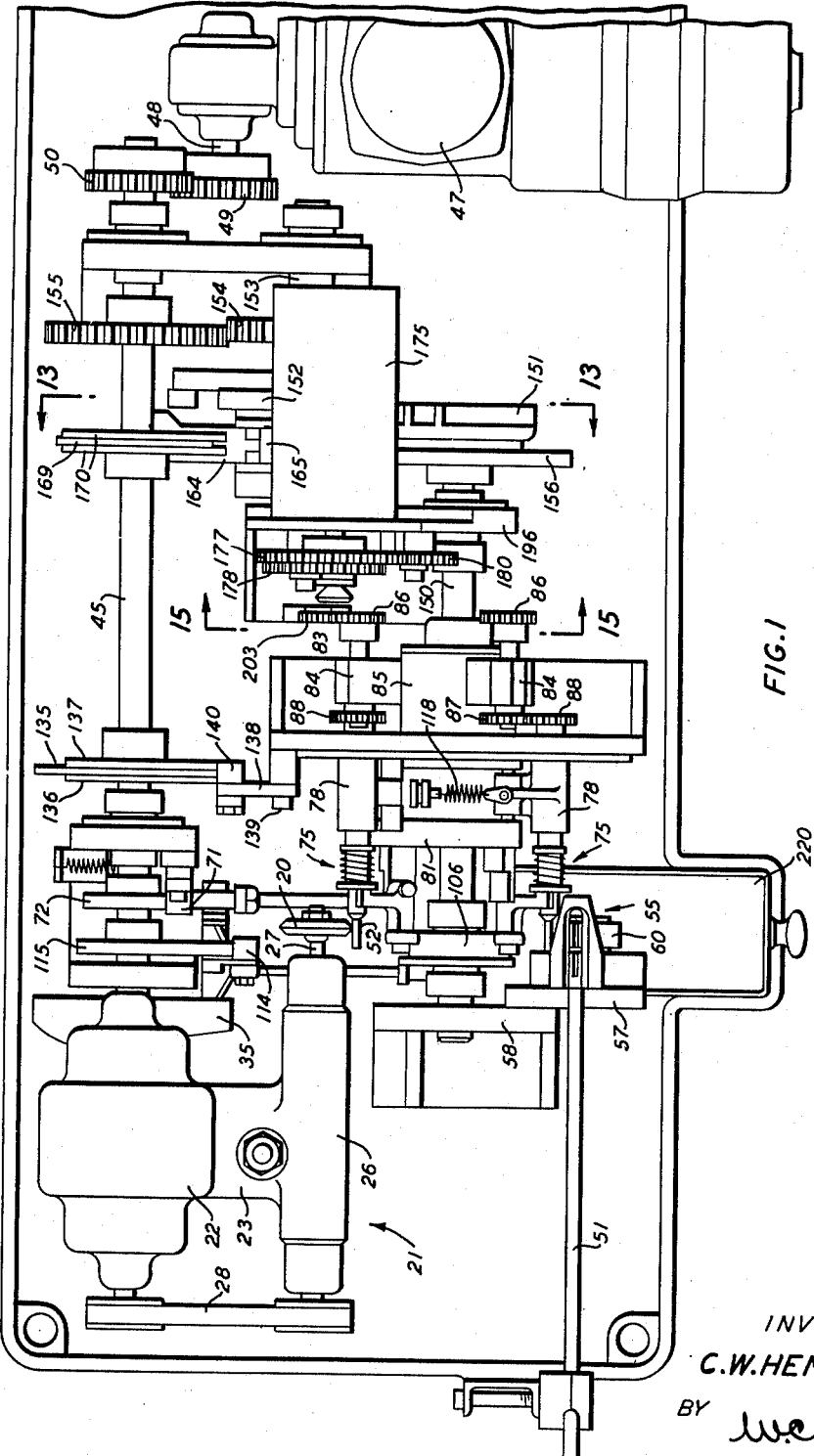
Fig. 1 is a fragmentary top plan view of the apparatus.

Referring now to the drawings, attention is first directed to the cutting wheel 20 and the unit 21 which may be termed the cutting unit shown more in detail in Figs. 1, 18 and 19. This unit includes a motor 22 supported by a bracket 23 which is fixedly mounted at 24 in any desired adjusted position by a carriage 25. The bracket 23 also supports a housing 26 in which a shaft 27 is journalled. The shaft 27 is driven through a belt and pulley attachment 28 to the shaft of the motor 22 and is provided with suitable means to support the cutting wheel 20. The cutting wheel is a commercially known diamond cutter supported at each side by metal washers 31 leaving exposed a portion of the cutter of suitable size to cut a groove in the article.

The carriage 25 which supports the unit 21 is mounted upon a table 33 as shown in Fig. 19 and positioned to be moved in a guided path in one direction by a spring 34 and in the opposite direction by a cam 35. The spring 34 is housed in an aperture 36 of the carriage 25 and is backed by a pin 38 carried by a bracket 39 mounted at 40 on the table 33. A cam roller 42 supported by a bracket 43 on the adjacent end of the carriage 25 is positioned to ride upon the cam 35 and be under the control thereof. The cam 35 is mounted on the adjacent end of a cam shaft 45 which is mounted in suitable bearings as illustrated in Fig. 1 and extends to the right in this figure where it is operatively connected to a driving means. The driving means for the cam includes a commercially known power unit 47 having an output shaft 48 upon which a gear 49 is mounted to drive a gear 50 which is fixedly mounted on the adjacent end of the cam shaft 45.

Figure 3:
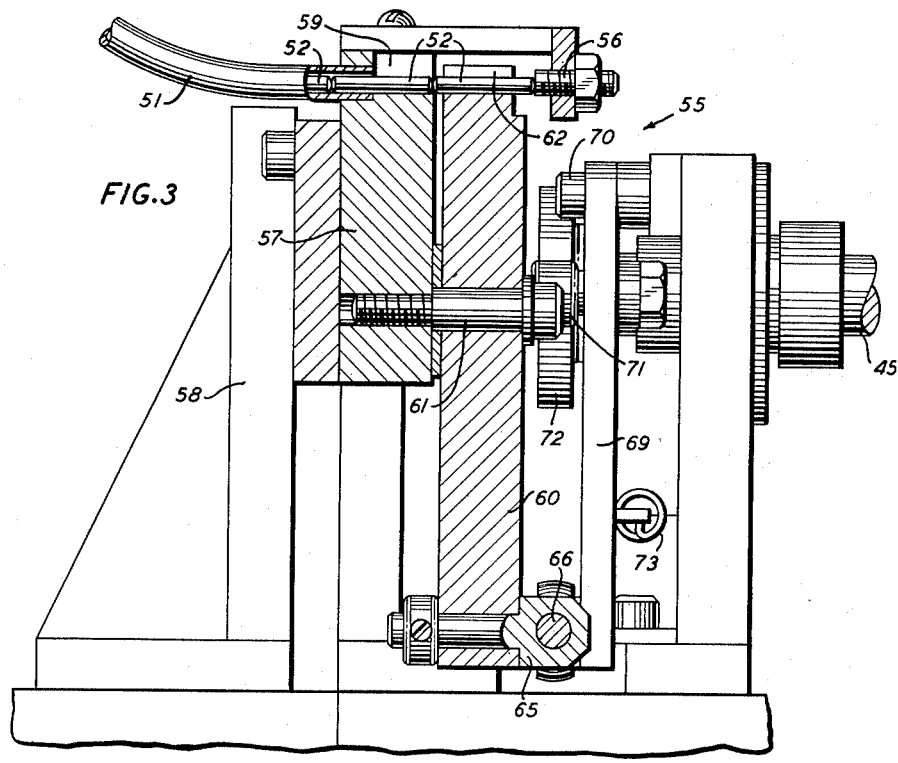
Fig. 3 is a vertical sectional view taken along the line 3—3 of Fig. 2.
Figure 4:
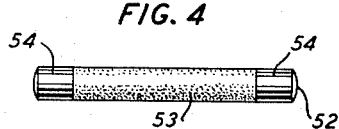
Fig. 4 illustrates one of the articles for resistors prior to being formed in the apparatus.

A multiplicity of the articles shown in Fig. 4 are fed successively through a feeding tube 51 shown in Figs. 1 and 3. The article 52 (Fig. 4) is composed of a cylindrical ceramic member of a given length having a coating 53 of a suitable carbon resistance material and contact portions 54 of conductive material formed or otherwise located at the ends of each article over the carbon coating. Attention is now directed to Fig. 3 which illustrates the articles 52 being fed successively to the feeding unit 55 where they are limited in their movement by an adjustable stop 56. The exit end of the tube 51 is supported by a stationary element 57 supported by a bracket 58. A notch 59 in the stationary element 57 is disposed in alignment with the exit end of the tube 51 to control the path of travel of each article passing from the tube.

Figure 2:
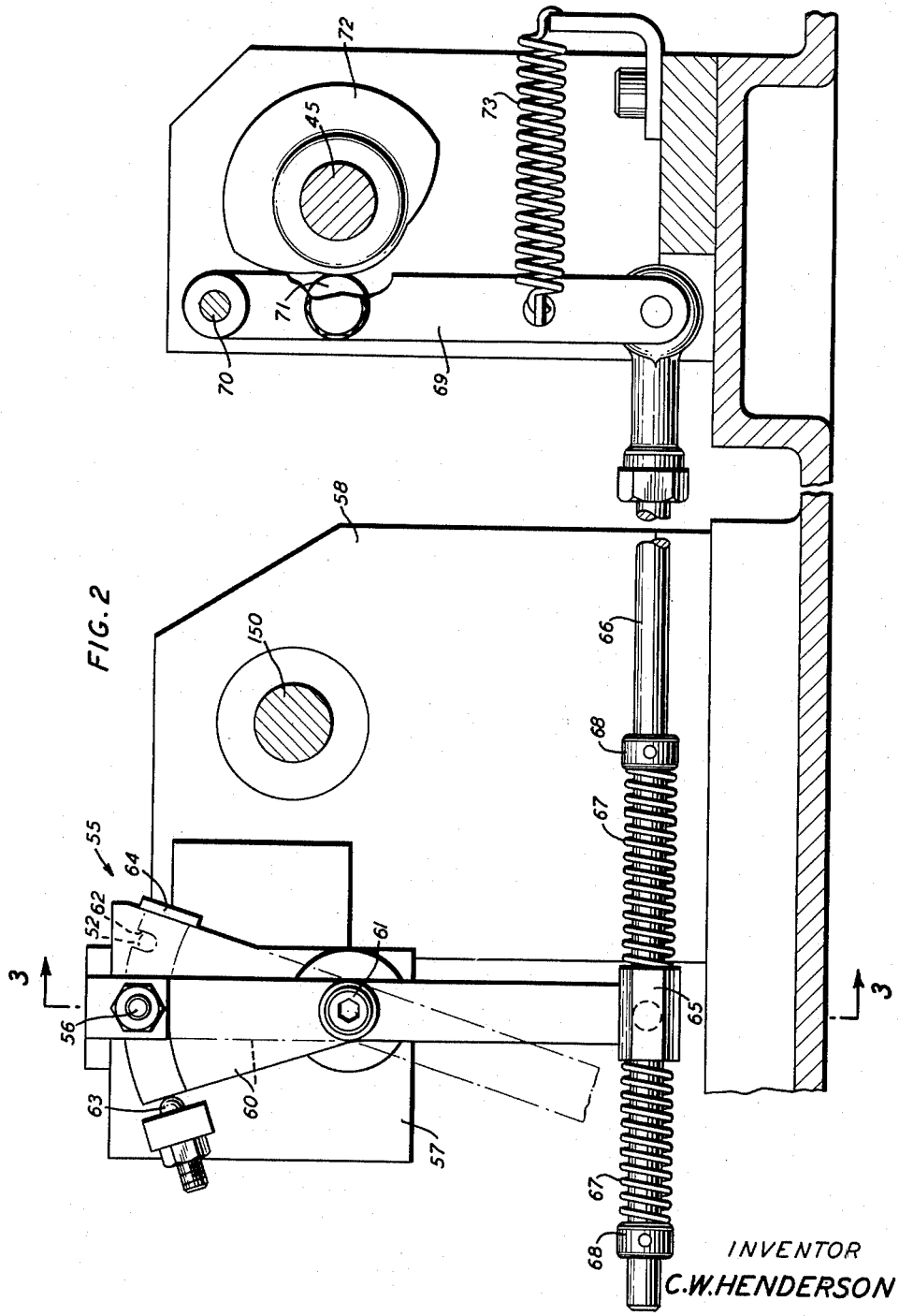
Fig. 2 is a fragmentary vertical sectional view illustrating the feeding mechanism.

An oscillating feeding member 60 of the contour shown in Figs. 2 and 3 is supported by a pivot 61 carried by the stationary element 57 and provided with a notch 62 at its upper end to be disposed in alignment with the notch 59 when the feeding member 60 is in the receiving position against an adjustable stop 63 shown in solid lines in Fig. 2. When the member 60 is in the solid line position, its notch 62 is positioned to receive the next article 52. However, the member 60 may be moved to the broken line position shown in Fig. 2 against a fixed stop 64 to locate the article carried thereby in a position to be received by one of the supporting chucks as hereinafter described. The mechanism for oscillating the feeding member 60 between the receiving position and the feeding position consists of a hollow member 65 pivotally mounted on the lower end of the element 60, through which a rod 66 passes. Springs 67 disposed upon each side of the hollow member 65 and backed up by collars 68 fixedly mounted on the rod 66 serve as flexible or cushioned connections between the feeding member 60 and the rod 66. The rod 66 is connected to a lower end of a cam lever 69 which is pivotally supported at 70, carrying a cam roller 71 normally urged into engagement with the cam 72 by a spring 73. The cam 72 is fixedly mounted on the cam shaft 45 and is driven thereby.

Figure 11:
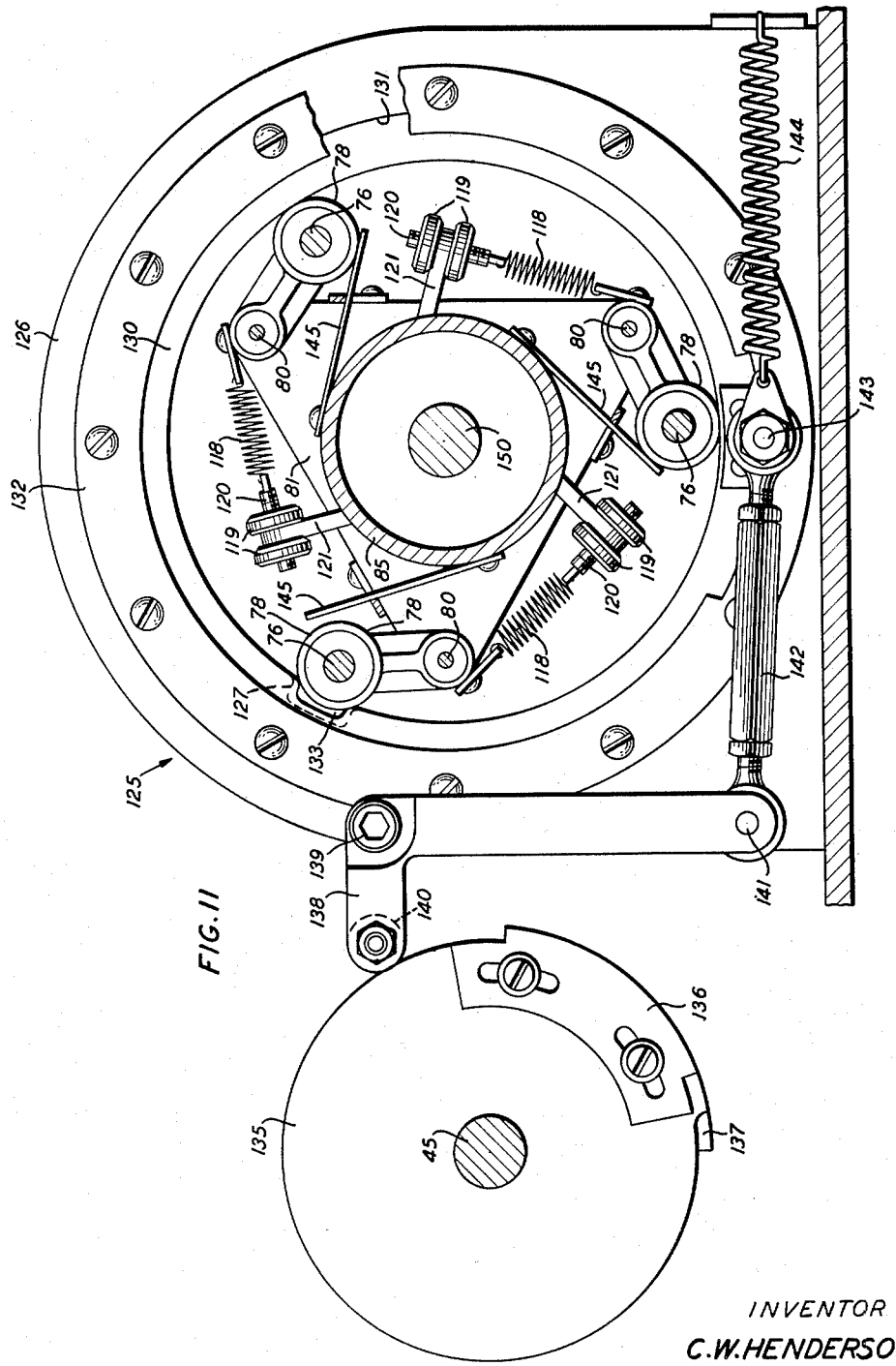
Fig. 11 is a vertical sectional view taken along the line 11—11 of Fig. 6.

The mechanism for receiving the articles successively from the feeding unit 55 includes a turret-like structure supporting three chucks indicated generally at 75 and disposed at equally spaced positions so that, while one chuck is in the operating position, another chuck will be in the ejecting position and the third chuck will be in the receiving position. Attention is now directed to Fig. 1, and Figs. 6 to 11 inclusive, particular attention at the moment being given to Fig. 7 which illustrates the detailed structure of each chuck 75. Each chuck includes a shaft 76 journalled in bearings 77 which are supported in a tubular portion of an arm 78, the arm having its inner end supported at 80 between triangular shaped members 81 as illustrated in Figs. 8 and 11. The center line or axis of the support 80 is coincident with the axis of a shaft 83 which is journalled in a suitable bearing 84 mounted on one of the cylindrical elements 85 which are fixed to the triangular members 81. A gear 86 is mounted on the outer end of the shaft 83 while a gear 87 is mounted on the inner end of this shaft interengaging a gear 88 which is mounted on the adjacent end of the shaft 76. A roller 89 is mounted on the shaft 76 between the gear 88 and the arm 78. The shaft 76 at the right of the arm 78 in Fig. 7 has a reduced portion 90 and serves as an important part of the chuck 75. A collar 92 is disposed concentric with the shaft 76 and is flanged to receive the adjacent end of a spring 93. The outer member 94 of the chuck is notched at 95 to receive the outer end of a pin 96 which is carried by the shaft, and limits movement of the outer chuck portion and provides a connection between this portion and the shaft. Resilient jaws 98 have tapered inner surfaces 99 to ride over the adjacent end of the shaft portion 90 when the outer chuck portion is moved to the left to cause the resilient jaws of the chuck to open to receive one of the articles 52 or to eject a finished article therefrom.

Figure 12:
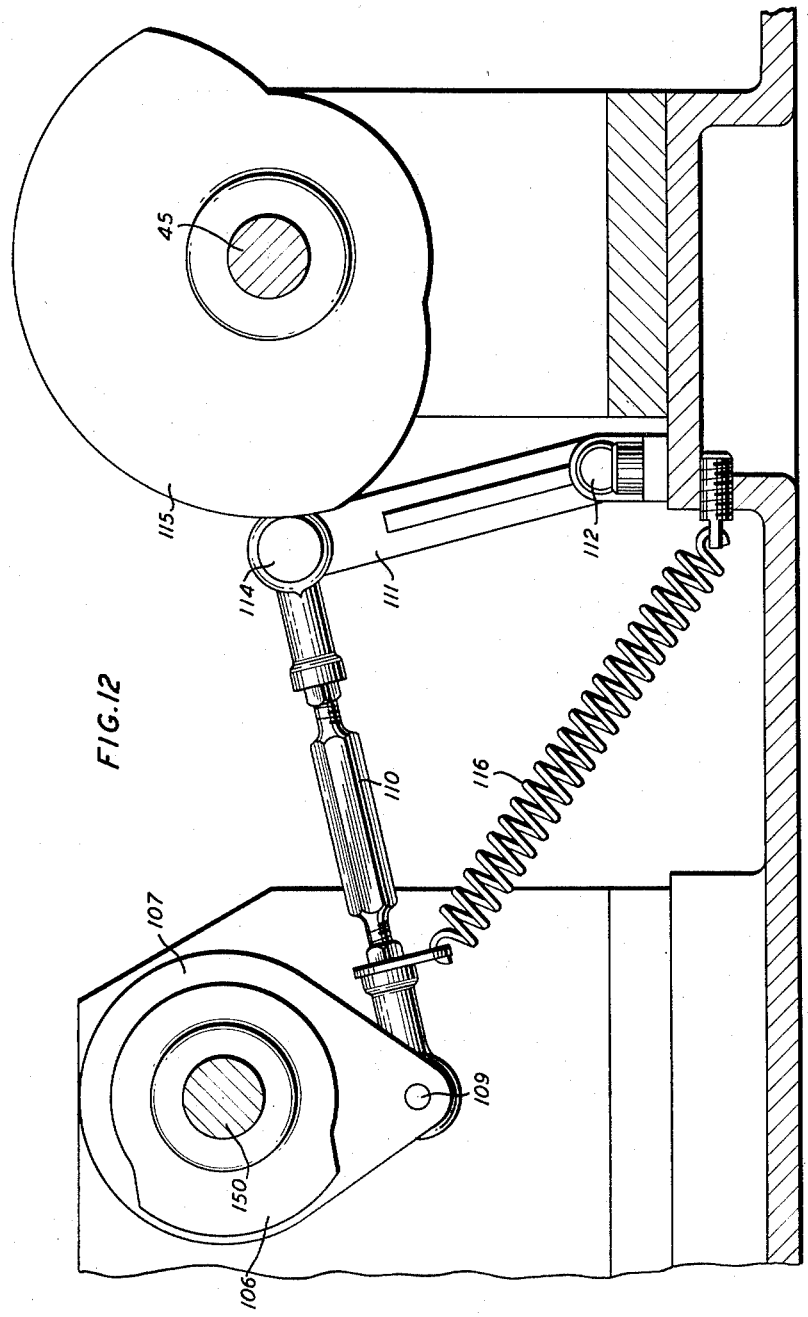
Fig. 12 is a fragmentary sectional view taken along the line 12—12 of Fig. 6.

Although Fig. 7 illustrates only one of the chuck units and its immediately associated driving means, it will be apparent by viewing the other figures in this group that the three chuck units equally spaced from each other are identical in structure. The mechanism for operating the chucks into open position is shown in Figs. 6, 10 and 12. Each chuck 75 has a cam lever 100 pivotally mounted at 101 on a bracket 102 which is fixed to the adjacent triangular member 81. The lever 100 has a bifurcated portion 104 to straddle the outermost portion of its chuck and engage the shoulder thereof to move it against the force of the spring 93 to move the chuck into its open position as illustrated at the lower portion of Fig. 6 and in Fig. 10. A cam roller 105 mounted on the cam lever 100 is positioned to ride on a cam 106 shown in Figs. 1, 6 and 12. The cam 106 is of an oscillating type supported by a member 107 for rocking movement on a shaft as illustrated in Fig. 12. The lower end of the member 107 is pivotally connected at 109 to one end of a rod 110, the other end of the rod being connected to a cam lever 111 pivotally supported at 112 and carrying a cam roller 114 which rides on a cam 115 under the force of a spring 116. The cam 115 is mounted on the cam shaft 45 and is driven thereby.

As illustrated in Figs. 6 and 11, the arms 78 of each of the chuck units is urged counterclockwise about its pivot 80 by springs 118, the forces of which may be varied through the adjustment of the handwheels 119 on the threaded elements 120 upon each side of their supporting brackets 121 which are carried by the adjacent cylindrical member 85. The function of each spring 118 is to move its chuck unit into the cutting position to cause the article held thereby to move against the cutting wheel 20. However, the chuck units are held inwardly or rather against this additional outer movement by the unit 125 shown in Figs. 6 and 11. The unit 125 includes a member 126 with a circular inner surface having a notch 127 therein at what may be termed the operating position. The rollers 89 of each chuck unit are positioned to enter the notch 127 when disposed adjacent the operating position so that at a given time the roller 89 may enter the notch as illustrated in Fig. 11 to allow its chuck to move outwardly a sufficient distance for its article to be cut. An annular member 130 disposed in an annular groove 131 of the main member 126 and held against displacement by a retaining ring 132 has a similar notch 133 positioned to register with the notch 127 during a given interval of time. The annular member 130 and its notch 133 are under the control of a cam 135 which is mounted on the cam shaft 45 and includes adjustable face plates 136 and 137 controlling the time interval the notches 133 and 127 are aligned with each other. A cam lever 138 pivoted at 139 carries a cam roller 140 riding on the periphery of the cam 135 while the lower end of the lever is connected at 141 to an arm 142 pivoted at 143 to the annular member 130 and urged by a spring 144 in a counterclockwise direction. To complete the structure shown in Fig. 11, resilient elements 145 serve as rests for each chuck unit as they are forced inwardly by the annular members 126 and 130.

Figure 13:
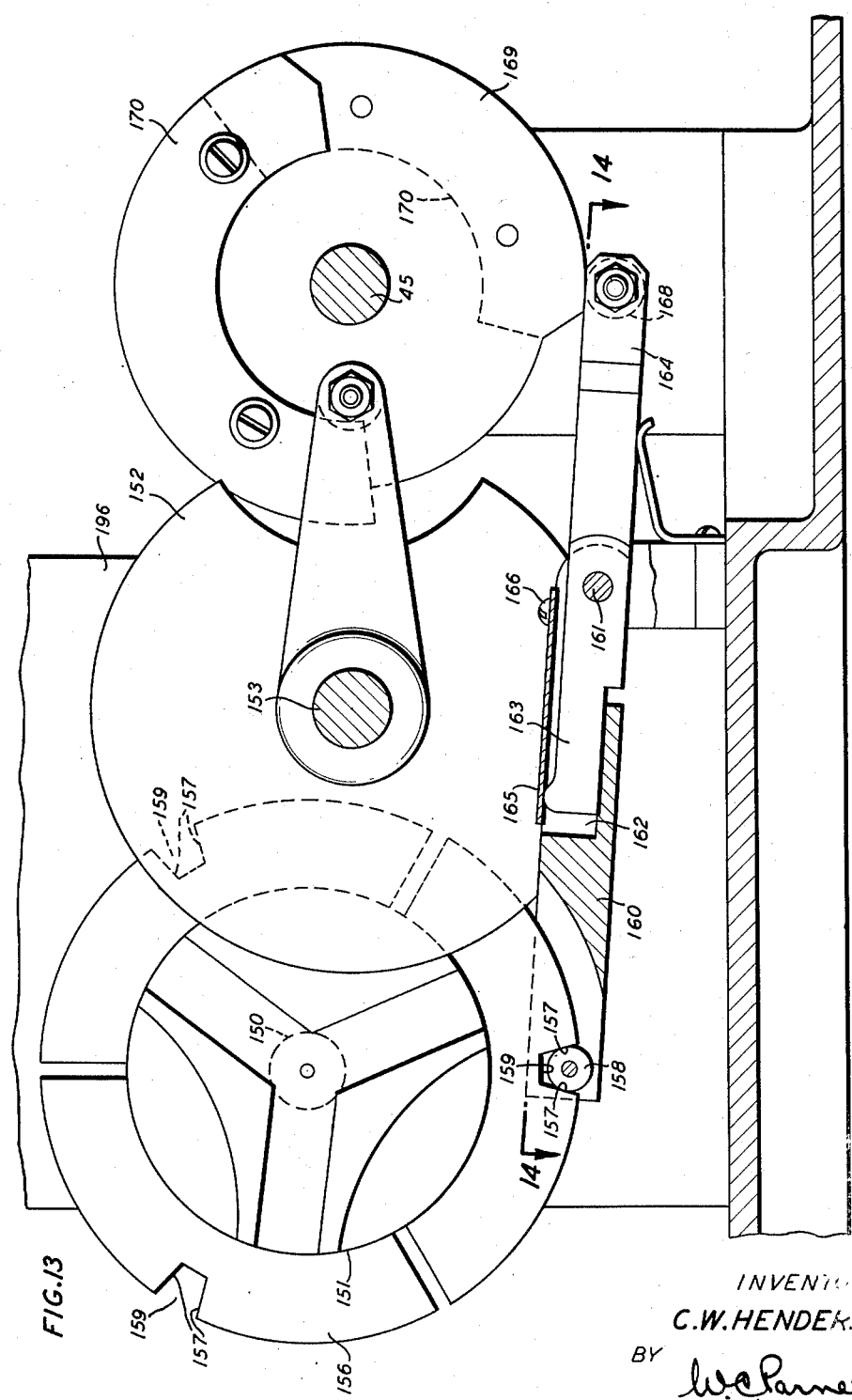
Fig. 13 is a fragmentary sectional view taken along the line 13—13 of Fig. 1.

The chuck supporting mechanism illustrated in Figs. 6 to 10 inclusive, including mainly the triangular members 81 and cylindrical members 85, constitutes the aforementioned turret which is mounted concentric with a shaft 150 and fixedly mounted thereon. The shaft 150 is journalled in suitable bearings and supports the rocking cam 106, Figs. 1 and 6, for movement thereon. The mechanism for imparting intermittent movement to the chuck supporting turret, as illustrated in Figs. 1, 13 and 14, includes a Geneva type wheel 151 mounted on the adjacent end of the shaft 150 actuated by its driving element 152 which is mounted on a shaft 153. The shaft 153 is journalled in suitable bearings and has a gear 154 mounted thereon and interengaging a gear 155 which is mounted on the cam shaft 45. In this manner, for each revolution of the cam shaft 45 the Geneva mechanism is operated one position, thus rotating the shaft 150 together with the chuck supporting turret one third of a revolution or 120 degrees to successively advance the chucks to the feeding, operating and ejecting positions.

A latching and locating mechanism associated with the driving mechanism is illustrated in Figs. 13 and 14. This mechanism includes three equally spaced notches 159 in the periphery of a disk-like element 156 mounted on the shaft 150 with the Geneva element 151, the notches having tapered surfaces 157 to be engaged by a roller 158 to latch the associated mechanism, particularly the shaft, with the chuck supporting turret against rocking motion during the intervals of rest and to accurately position the turret to assure accurate positioning of the chucks thereof with respect to the feeding unit and the cutting wheel. The roller 158 is supported by an arm 160 which is pivotally mounted at 161 and recessed at 162 to receive the adjacent end 163 of a cam lever 164. A spring or resilient element 165 fixedly mounted at 166 on the arm 160 functions normally to cause the arm 160 and cam lever 164 to act as a solid unit, permitting relative movement of the arm and lever, however, should anything tend to interfere with the usual operation thereof. A cam roller 168 mounted at the outer end of the lever 164 is positioned to be engaged by a cam 169 which is mounted on the cam shaft 45 and provided with adjustable plates 170 to vary the effective length of the high portion thereof.

A mechanism is provided to drive the chuck units 75 when in the operating position adjacent the cutting wheel 20. This mechanism is shown in Figs. 1, 15, 16, and 17, and originates with a motor 175. The motor 175 has an output shaft 176 which drives a large gear 177 and a smaller gear 178. The gear 177 drives a gear 180 while the smaller gear 178 drives a gear 181. It will be apparent that while the motor shaft 176 is driven at a constant known speed, driving the gears 177 and 178 at like speeds, the gears 180 and 181 which are identical will be driven at different speeds due to the difference in the sizes of the gears 177 and 178. These two driving speeds are provided in the apparatus and either one may be employed depending upon the number of spiral convolutions to be cut in the carbon coating of each article.

In the present embodiment of the invention, the driving mechanism illustrated in Figs. 15 and 16 employs the drive extending through gears 178 and 181. A pair of gears 182 and 183 connected to each other by suitable means 184 and mounted on a shaft 185 are disposed in different planes for engagement with their respective gears 180 or 181. The shaft 185 is hollow as shown in Fig. 17, and is supported by an arm 187 movable about a sleeve 188 the axis of which is coincident with that of a gear 189. A spring pressed plunger 190 extending through the hollow shaft 185 is receivable in either one of two apertures 191 or 192 to latch this mechanism in either one of the two positions wherein the drive is received from either gear 181 or 180 respectively. An element 194 threadedly connected to the upper end of the arm 187 is positioned to ride in an arcuate aperture 195 in the bracket 196 and to otherwise maintain the arm in either selected position.

The gear 189 mounted on its shaft 198 is positioned to be engaged by a pinion 200 which is mounted on a shaft 201 journalled in a suitable bearing portion in the upper end of an arm 202. A pinion 203 similar in size to the pinion 200 is mounted on the opposite end of the shaft 201 as shown in Fig. 16. The arm 202 is pivotally supported at 205 and normally urged clockwise (Fig. 15) by a spring 206 until its adjustable stop 207 engages a projection 208 on the bracket 196.

Considering now the operation of the apparatus, let it be assumed that the various power units are in operation and that the articles 52 are being fed successively to the feeding unit shown in Figs. 1, 2, and 3. Due to the fact that the indexing mechanism for the chuck supporting turret and the feeding mechanism for the articles are under the control of the cam shaft 45 and its associated mechanism, the articles 52 received singly from the tube 51 (Fig. 3) are moved to the receiving position shown in broken lines (Fig. 2) where the adjacent chuck unit 75 will be open, as shown in Fig. 10 and at the lower portions of Figs. 1 and 6, to receive the next article. The chuck at this position is opened through the operation of the cam 115 (Figs. 1 and 12), rocking the element 106 to move the mechanism shown in detail in Fig. 10 to force the yoke 104 against the force of the spring 93 moving the resilient gripping portions of the chuck against the pin-like portion 90 of the shaft 76 to open the jaws of the chuck prior to the positioning of the article in the feeding position. The article is moved into the feeding position to be received by the chuck through the actuation of the cam 72 (Fig. 2) rocking the feeding element 60 to the broken line position against the fixed stop 64. The chuck at the receiving or loading position is allowed to move into its closed position prior to the indexing of the turret. As the chuck at the loading position is closed, its resilient jaws move outwardly over the adjacent end of the article to grip the article and thus hold it in axial alignment with the driving shaft of the chuck.

Figure 5:
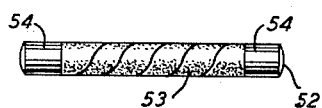
Fig. 5 illustrates the completed article as a result of the apparatus.

The turret is then indexed through the operation of the mechanism shown in Fig. 13, moving the loaded chuck with its article from the feeding position to the operating position. The cutting wheel 20 with its associated mechanism shown in Figs. 18 and 19 is in the starting position prior to the time the article is moved into engagement therewith. When the turret has been indexed to move the loaded chuck to the operating position, the article is not moved directly into engagement with the grinding wheel as additional mechanism must be operated to accomplish this purpose. This mechanism is shown in Figs. 6 and 11 under the control of cam 135 to move the annular element 130 to align its notch 133 with the notch 127 in the main element 126 permitting the arm 78 of the chuck unit to be moved outwardly or counter-clockwise (Fig. 11) by the pull of its spring 118, forcing the article against the cutting wheel by the force embodied in the spring. At this time the cam 35 functions to allow the spring 34 (Fig. 18) to move the carriage supporting the unit 21 so that the cutting wheel may move longitudinally of the axis of the article to cut a helical groove in the carbon coating on the article as illustrated in Fig. 5 during rotation of the chuck at the operating position. Actually the cut extends through the carbon coating and into the ceramic material.

The rotation of the chuck at the operating position is accomplished by the gear 86 of that particular chuck unit moving into and interengaging the pinion 203 (Figs. 6 and 15) of the driving mechanism originating with the motor 175. The selected train of gears in this mechanism, shown particularly in Figs. 15 to 17 inclusive, will be operating continuously, and although the gear 86 of the chuck unit 75, moved into the operating position, may not mesh immediately with the pinion 203, the flexible supporting mechanism for the pinions 200 and 203 will permit movement thereof until the teeth of the gear 86 and the pinion 203 intermesh. This possible failure of the interengagement of the gear 86 and pinion 203 will be only instaneous and occur prior to the movement of the chuck unit outwardly into the cutting position through the operation of the cam 135. The chuck unit in the operating position will, through the mechanism just described, be rotated at a given speed whereby a helical groove will be formed in the article through the cooperation of the mechanism including the cam 35 to traverse the cutting unit. To change the contour of the helical groove, the driving mechanism may be varied by shifting the connection from gear 181 to gear 180 in Fig. 15.

After the article has been formed, that is, after the helical groove has been cut therein, the turret supporting the chucks is indexed and at the proper time during this indexing or prior to that time, the cutting unit 21 is returned to its initial or starting position. Prior to this occurrence, however, at the termination of the forming or cutting operation, the cam 135 (Fig. 11) functions to permit the spring 144 to rock the element 130 to close the notch 127 and thereby move the adjacent chuck unit out of cutting position, terminating the cutting operation regardless of the traversing means for the cutting unit or the rotating means for the chuck unit. When the chuck supporting turret is indexed to the next position, the completed article is ejected into a suitable receptacle 220 through the operation of the mechanisms shown in Figs. 10 and 12, making the chuck ready to receive another article at the loading position. There are in effect three positions for the chuck units, the feeding position where the articles are fed singly into the chucks while they are opened through the operation of the cams 115. This same mechanism functions at the third position which may be termed the ejecting position while it remains ineffective in the intermittent or operating position.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An article cutting apparatus comprising a turret mounted for intermittent movement about its axis, like rotatable chucks, pivoted arms for supporting the chucks mounted at spaced positions about the turret, means to normally urge the arms with the chucks outwardly under given forces, a cutter rotatable about its axis and movable axially between given limits, and means to normally hold the chuck arms against outward movement operable to release the chucks when in an operating position adjacent the cutter whereby the article will be moved into the cutter.

2. An article cutting apparatus comprising a turret mounted for intermittent movement about its axis, like rotatable chucks, pivoted arms for supporting the chucks mounted at spaced positions about the turret, means to normally urge the arms with the chucks outwardly under given forces, a cutter rotatable about its axis and movable axially between given limits, and means to normally hold the chuck arms against outward movement operable for a given length of time during axial movement of the cutter to release the chucks singly when in an operating position adjacent the cutter whereby a spiral groove of a given length will be cut into the article.

3. An article cutting apparatus comprising a turret mounted for intermittent movement about its axis, like rotatable chucks for receiving articles to be cut, pivoted arms for supporting the chucks mounted at spaced positions about the turret, means to normally urge the arms with the chucks outwardly under given forces, a cutter rotatable about its axis and movable axially between given limits, and an element having a substantially circular aperture therein and an offset portion adjacent an operating position adapted to hold the chuck arms against outward movement until they reach the offset portion whereby the article will be moved into the cutter.

4. An article cutting apparatus comprising a turret mounted for intermittent movement about its axis, like rotatable chucks for receiving articles to be cut, pivoted arms for supporting the chucks mounted at spaced positions about the turret, means to normally urge the arms with the chucks outwardly under given forces, a cutter rotatable about its axis and movable axially between given limits, a substantially annular track having an offset portion adjacent an operating position, means carried by the chuck arms to ride on the track to hold the chuck arms against outward movement until they reach the offset portion whereby the article will be moved into the cutter.

5. An article cutting apparatus comprising a turret mounted for intermittent movement about its axis, like rotatable chucks for receiving articles to be cut, pivoted arms for supporting the chucks mounted at spaced positions about the turret, means to normally urge the arms with the chucks outwardly under given forces, a cutter rotatable about its axis and movable axially between given limits, a substantially annular track having an offset portion adjacent an operation position, means carried by the chuck arms to ride on the track to hold the chuck arms against outward movement until they reach the offset portion whereby the article will be moved into the cutter, and means operable to move the track to vary the time the chuck arms will be in the offset portion to vary the length of cut in the articles.

CLIFFORD W. HENDERSON.

References Cited in the file of this patent

UNITED STATES PATENTS

| Number | Name | Date |
|---|---|---|
| 766,403 | Vincke | Aug. 2, 1904 |
| 1,635,184 | Jones | July 12, 1927 |
| 1,640,993 | Hanson | Aug. 30, 1927 |
| 1,918,626 | Wilt | July 18, 1933 |
| 1,997,978 | Raule | Apr. 16, 1935 |
| 2,005,375 | Jones et al. | June 18, 1935 |
| 2,050,422 | Dalkowitz | Aug. 11, 1936 |
| 2,059,710 | Rupple | Nov. 3, 1936 |
| 2,224,265 | Johnson et al. | Dec. 10, 1940 |
| 2,237,583 | Birkigt | Apr. 8, 1941 |
| 2,390,533 | Hill | Dec. 11, 1945 |
| 2,405,485 | Barkstrom et al. | Aug. 6, 1946 |
| 2,475,091 | Hackman | July 5, 1949 |

FOREIGN PATENTS

| Number | Country | Date |
|---|---|---|
| 388,490 | Germany | Jan. 19, 1924 |